United States Patent [19]

South

[11] 3,748,533
[45] July 24, 1973

[54] DIGITAL TACHOMETER

[75] Inventor: Robert F. South, Dallas, Tex.

[73] Assignee: Beta Engine Systems Corporation, Watertown, Mass.

[22] Filed: Jan. 31, 1972

[21] Appl. No.: 222,173

[52] U.S. Cl. .................................. 317/5
[51] Int. Cl. ............................. G01p 3/00
[58] Field of Search ........................ 317/5

[56] References Cited
UNITED STATES PATENTS

| | | | |
|---|---|---|---|
| 3,416,040 | 12/1968 | Foster et al. | 317/5 |
| 3,560,854 | 2/1971 | Moss et al. | 317/5 |
| 3,599,154 | 8/1971 | Carol, Jr. et al. | 317/5 |

Primary Examiner—L. T. Hix
Attorney—Edgar H. Kent

[57] ABSTRACT

A digital tachometer which is compact, highly reliable, and economically implemented with conventional circuitry including in combination with transducer means for generating a pulsed signal, a decade counter, timing means for determining a timing period, and control means whereby said counter accumulates count during the timing period. Display means receives and displays the count at the end of a timing period, and monitor means receives and compares the accumulated count with programmed set points or limits.

18 Claims, 4 Drawing Figures

DIGITAL TACHOMETER

This invention relates generally to tachometers, and more particularly to an improved tachometer utilizing digital circuitry and including monitoring and control capabilities.

The use of speed monitoring equipment for controlling the operation of machinery is widely employed. In the case of rotating apparatus an operator often monitors a tachometer to determine and control output of the apparatus.

The present invention is a digital tachometer which is compact, accurate, and economically implemented with standard, commercially available integrated circuits.

Features of the invention include an input transducer means for generating a pulsed electrical signal indicative of the speed of a rotary member and counter means for counting the pulses of said signal. Accurate timing means including an oscillator and frequency divider means establishes a time period during which pulses are counted, and a display means is provided for displaying the accumulated count at the end of said time period.

Advantageously, monitor means is provided which is interconnected with the display means and is responsive to a pulse count outside of prescribed limits by providing an alarm and/or providing through suitable feedback means speed control of the rotary members.

These and other objects and features of the invention will be more readily apparent from the following description and appended claims when taken with the drawings, in which:

Like elements in the figures have the same reference numerals.

Figure 1:
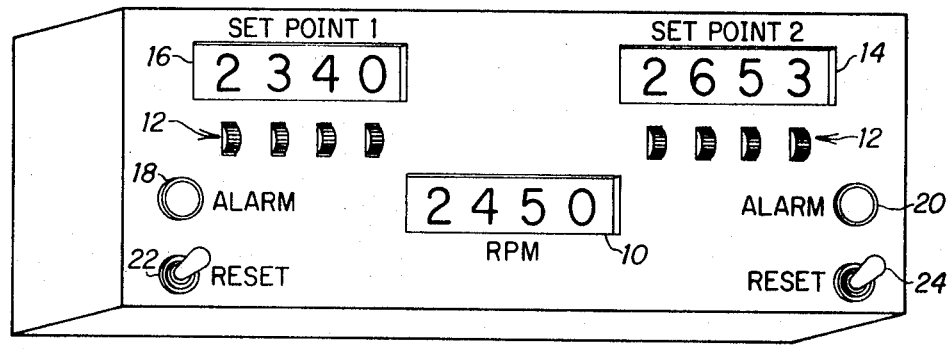
FIG. 1 is a prespective view of a digital tachometer in accordance with the present invention.

Referring now to the drawings, FIG. 1 is a perspective view of one embodiment of a digital tachometer in accordance with the invention illustrating in detail the front panel thereof. Rotary speed as determined by pulse count within a specific time period, described further below, is shown on digital display 10. Upper and lower set points or speed limits, as established by manually operated rotary wheels shown generally at 12, are shown on displays 14 and 16, respectively. Should the measured speed coincide with either set point or speed limit, then a visual and/or audio alarm 18 or 20 will be activated. Concurrently, through suitable feedback means speed of the apparatus may be adjusted accordingly. Upon return of an acceptable operating speed, the alarms 18 and 20 may be reset by toggle switches 22 and 24, respectively.

Figure 2:
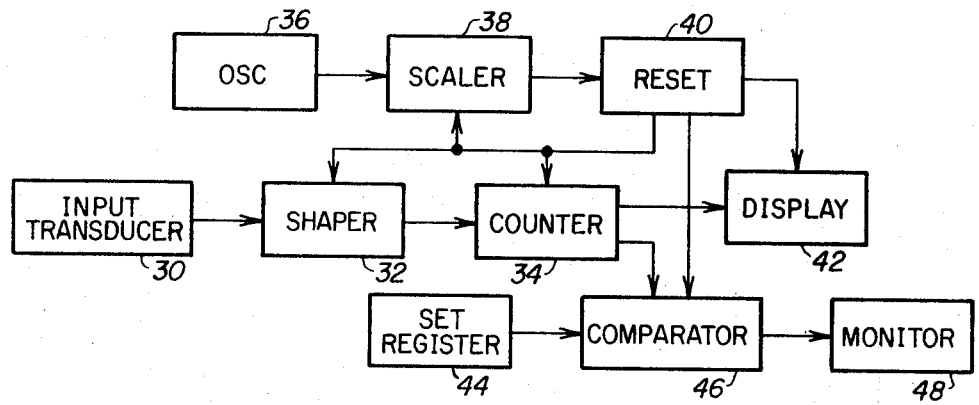
FIG. 2 is a functional block diagram of a digital tachometer in accordance with the present invention.

FIG. 2 is a functional block diagram of the digital tachometer. Input transducer means 30 generates a pulsed electrical signal indicative of the speed of a shaft, gear, or other machine component to be monitored. The transducer means may be a magnetic pickup, optical encoder, proximity tube or like conventional means for producing a known number of pulses for each revolution of the monitored device. The output of transducer 30 is applied to pulse shaper 32 which establishes suitable pulse width and voltage level, and the shaped pulses are then applied to decade counter 34.

Controlling operation of shaper 32 and counter 34 is timing means comprising a crystal controlled oscillator 36, scaler 38, and reset means 40. The frequency of oscillator 36 is applied to frequency dividers within scaler 38 to obtain a desired timing period for the tachometer. For example, if the oscillator generates a 100 KHz signal, five serially connected decade counters may be employed to obtain a one second timing period. At the end of each timing period, inhibit, enable, and reset signals are produced by reset means 40 for the various portions of the tachometer, as described further below.

At the end of a timing period, the accumulated count of counter 34 is received by display 42 and the display is enabled to show the count. During the timing period, the accumulating count and the limits established in set register 44 are provided to comparator 46. In the event that the count corresponds to either limit, monitor 48 is activated to sound or display an alarm and/or provide feedback to control the monitored apparatus.

Operation of the timing means in accordance with one embodiment will now be described with reference to the FIG. 3 schematic of the timing, count, and display portions of the tachometer. At the end of the timing period, decade counter scaler 38 applies a pulse to monostable multivibrator 50. In accordance with commercially available circuits, multivibrator 50 has two outputs 51 and 52 which momentarily have a negative going pulse and a positive going pulse, respectively, as illutrated. Typically, the pulse width is very much smaller than the timing period, e.g. on the order of a nanosecond. Output 52 drives a second monostable multivibrator 54 with output 55 thereof having a negative going pulse in response thereto. Inverter 56 receives and inverts the pulse from output 55 as shown on inverter outputs 57 and 58.

The input from the transducer is applied at terminal 60 and passes through shaper 32 comprising shunt capacitor 62, series resistor 64, and shunt zener diode 66 to the input to a monostable multivibrator 68. An output of multivibrator 68 drives the decade counter 34.

At the end of a timing period, as established by scaler 38, an inhibit pulse from multivibrator 50 is applied to multivibrator 68 thereby inhibiting further count. Simultaneously, an enable pulse from multivibrator 50 is applied to display 42 thereby allowing display 42 to latch on to the accumulated count of counter 34. Concurrently, reset signals are applied to the decade counters of scaler 38 and counter 34 for the beginning of the next timing period. Upon removal of the inhibit signal to multivibrator 68, pulses are counted for the next timing period.

It will be noted that Inhibit and Reset signal lines shown generally at 70 are provided for the comparator 46 of the tachometer. This portion of the tachometer is shown in more detail in the schematic of one embodiment illustrated in FIG. 4. The comparator comprises a plurality of dual input exclusive OR gates shown generally at 72 arranged in groups of four whereby each group represents a binary coded decimal digit. The set wheels 74 selectively switchably connect gates 72 through diodes 76 to a set line 78 in accordance with the desired set limit. One input to each gate is obtained from the scaler and the other input to each gate is obtained from the display. For example, the group of gates corresponding to the thousands digit receives 1K, 2K, 4K, and 8K inputs from the scaler and from the display in accordance with conventional binary coded decimal code.

So long as the counter reading does not correspond to the set limit, as established by the set wheels 74, one or more of exclusive OR gates 72 will provide a positive voltage level to line 78. However, should the display reading correspond to the set limit, all of the exclusive OR gates are off and voltage on line 78 goes from the positive level to near ground potential.

Figure 4:
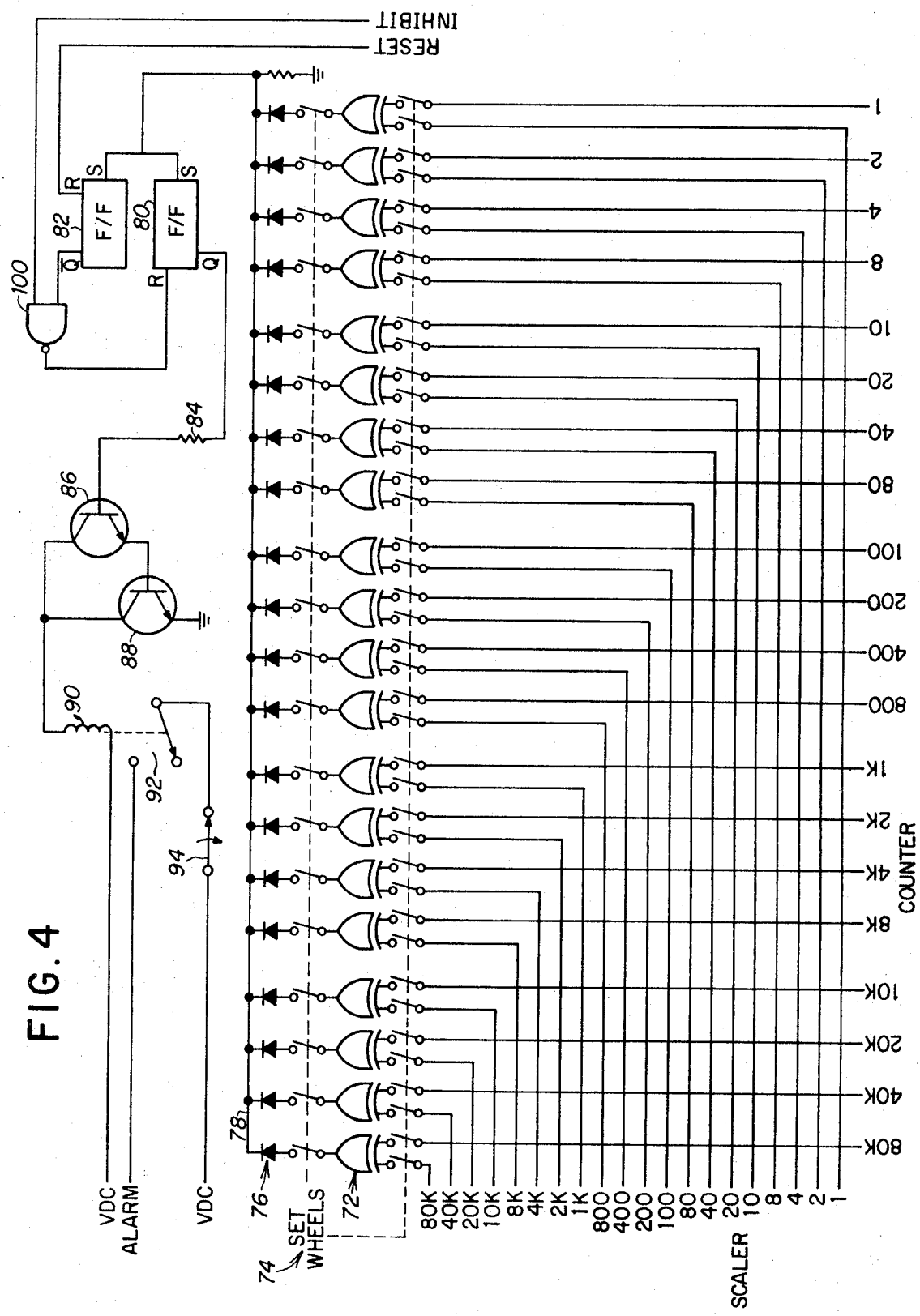
FIG. 4 is a more detailed schematic of the comparator and monitor portions of the diagram of FIG. 2.

Consider now the effects of the two voltage levels on the remainder of the monitor portion in FIG. 4. Line 78 is connected to the set terminals of two set-reset flip-flops 80 and 82. Negative going voltages on the set terminals will set the flip-flops to the true or Q output. However, so long as the set input remains at the positive voltage level, flip-flop 80 maintains an output only at the $\overline{Q}$ or untrue output which is not connected in circuit.

When the display reading corresponds to the set limit, the set input to flip-flop 80 goes negative, as aforesaid, and a positive output voltage appears at the Q output. This output is connected through resistor 84 to the base of transistor 86, and transistor 86 is rendered conductive. Base current flows through transistor 86 to transistor 88, and transistor 88 becomes conductive, also. Relay coil 90, in line with transistor 88, is energized thereby closing relay contact 92, in turn actuating alarm means and providing self-energization of the relay coil. Switch 94 is provided to reset the alarm after corrective action is taken to resume normal speed within the set limits.

Figure 3:
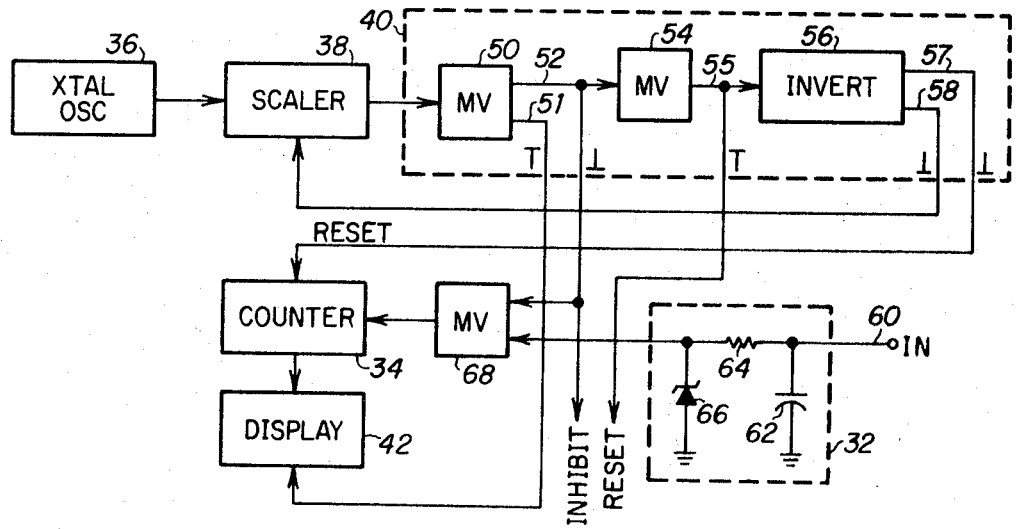
FIG. 3 is a more detailed schematic of the timing, count, and display portions of the diagram of FIG. 2.

An inhibit signal from the circuit of FIG. 3 is applied to one input of NAND gate 100 to inhibit monitor operation at the end of each timing period when the counter is reset and a spurious count could inadvertently cause an alarm. The other input to NAND gate 100 is taken from the $\overline{Q}$ output of flip-flop 82. A reset signal to reset the comparator at the beginning of the new count period is provided to the reset terminal of flip-flop 82. When the inhibit signal is not present, NAND gate 100 will have the one input from the $\overline{Q}$ output of flip-flop 82, and a positive voltage from the output of gate 100 is applied to the reset terminal of flip-flop 80. Upon receiving the inhibit signal, the output of gate 100 moves negatively thereby resetting flip-flop 80 or maintaining the $\overline{Q}$ output on flip-flop 80 during the inhibit period. The reset pulse is applied to flip-flop 82 to maintain the $\overline{Q}$ output of flip-flop 82 during the inhibit period, also. Thus, the alarm cannot be actuated during the inhibit period.

A digital tachometer in accordance with the invention is highly accurate and reliable and can be implemented using conventional circuitry. In one embodiment corresponding to the described embodiment the following circuits and components were used:

| | |
|---|---|
| Decade counters | SN 7490N |
| Multivibrators | SN 74121N |
| Flip-flops | SN 7474N |
| NAND gate | SN 7400 |
| Exclusive OR gate | SN 7486N |
| Inverter | SN 7404N |
| Display | 5082-7300 |

While the invention has been described with reference to specific embodiments, the description is illustrative and is not to be construed as limiting the invention. Various modifications and changes may occur to those skilled in the art without departing from spirit and scope of the invention as defined by the appended claims.

I claim:

1. A digital tachometer comprising input transducer means for generating a pulsed electrical signal indicative of the speed of a rotary member, decade counter means for receiving said electrical signal and generating a count of the pulses received during a time period, timing means including oscillator means and frequency divider means for reducing the frequency of the oscillator output and providing said time period, display means connected with said counter means for visually indicating pulse count from said counter, and control means driven by said frequency divider means and generating at the end of said time period reset signals for said decade counter means and said frequency divider means and an enabling signal for said display means to receive and display the count of said decade counter means.

2. A digital tachometer as defined by claim 1 wherein said control means comprises first and second serially connected monostable multivibrators with said first multivibrator being driven by said frequency divider means and said second multivibrator being driven by said first multivibrator, said enabling signal for said display means being derived from the output of said first multivibrator and said reset signals being derived from the output of said second multivibrator.

3. A digital tachometer as defined by claim 2 wherein the pulse width at the outputs of said multivibrators is much smaller than said timing period.

4. A digital tachometer as defined by claim 2 and further including pulse shaper means interconnected between said input transducer means and said decade counter means including voltage limiting means for receiving said pulsed signal from said input transducer means and a third monostable multivibrator.

5. A digital tachometer as defined by claim 4 wherein an inhibit signal is derived from said first multivibrator for inhibiting operation of said third multivibrator at the end of said timing period.

6. A digital tachometer as defined by claim 5 and further including monitor means interconnected with said counter means and responsive to said pulse count being outside of prescribed limits.

7. A digital tachometer as defined by claim 6 wherein said monitor means includes set point means for establishing said prescribed limits and comparator means for comparing said pulse count with said prescribed limits.

8. A digital tachometer as defined by claim 7 wherein said set point means comprises first means for establishing a lower speed limit and second means for establishing an upper speed limit, each of said means including a plurality of two input exclusive OR gates, one input of each gate being connectable to said frequency divider means and the other input of each gate being connectable to said counter, switch means for connecting specific gates in accordance with the desired limit, flip-flop means, response means, means connecting said flip-flop means to said response means, and means connecting the outputs of said gates to said flip-flop means whereby said flip-flop means is tripped thereby initiating said response means when the inputs from said counter correspond to said limit.

9. A digital tachometer as defined by claim 8 wherein an inhibit signal is derived from said first multivibrator for inhibiting said flip-flop means at the end of each time period and a reset signal is derived from said first multivibrator for resetting said flip-flop means for the beginning of the next time period.

10. A digital tachometer as defined by claim 9 wherein said response means comprises an alarm.

11. A digital tachometer as defined by claim 9 wherein said response means includes feedback control means to the rotary member drive means.

12. A digital tachometer as defined by claim 1 and further including monitor means interconnected with said counter means and responsive to said pulse count being outside of prescribed limits.

13. A digital tachometer as defined by claim 12 wherein said monitor means includes set point means for establishing said prescribed limits and comparator means for comparing said pulse count with said prescribed limits.

14. A digital tachometer as defined by claim 13 wherein said set point means comprises first means for establishing a lower speed limit and second means for establishing an upper speed limit, each of said means including a plurality of two input exclusive OR gates, one input of each gate being connectable to said frequency divider means and the other input of each gate being connectable to said counter, switch means for connecting specific gates in accordance with the desired limit, flip-flop means, response means, means connecting said flip-flop means to said response means, and means connecting the outputs of said gates to said flip-flop means whereby said flip-flop means is tripped thereby initiating said response means when the inputs from said counter correspond to said limit.

15. A digital tachometer as defined by claim 14 wherein an inhibit signal is derived from said control means for inhibiting said flip-flop means at the end of each time period and a reset signal is derived from said control means for resetting said flip-flop means for the beginning of the next time period.

16. A digital tachometer comprising:
a. decade counter means for receiving and counting a pulsed electrical signal;
b. timing means including an oscillator and a frequency divider means for providing a time period;
c. control means driven by said frequency divider means for providing reset signals at the end of each said time period to said decade counter means and to said frequency divider means;
d. display means connected to receive and display pulse count from said decade counter means at the end of each said time period upon receipt of an enabling signal from said control means; and
e. monitor means interconnected with said counter means and responsive to said pulse being outside of prescribed limits, said monitor means including set point means for establishing said prescribed limits and comparator means for comparing said pulse count with said prescribed limits.

17. A digital tachometer as defined by claim 16 wherein said control means comprises first and second serially connected monostable multivibrators with said first multivibrator being driven by said frequency divider means and said second multivibrator being driven by said first multivibrator, said enabling signal for said display means being derived from the output of said first multivibrator and said reset signals being derived from the output of said second multivibrator.

18. A digital tachometer as defined by claim 16 wherein said set point means comprises first means for establishing a lower speed limit and seocnd means for establishing an upper speed limit, each of said means including a plurality of two input exclusive OR gates, one input of each gate being connectable to said frequency divider means and the other input of each gate being connectable to said counter, switch means for connecting specific gates in accordance with the desired limit, flip-flop means, response means, means connecting said flip-flop means to said response means, and means connecting the outputs of said gates to said flip-flop means whereby said flip-flop means is tripped thereby initiating said response means when the inputs from said counter correspond to said limit.

* * * * *